United States Patent [19]

Baugh et al.

[11] Patent Number: 4,647,254
[45] Date of Patent: Mar. 3, 1987

[54] MARINE RISER STRUCTURAL CORE CONNECTOR

[75] Inventors: Benton F. Baugh, Houston; Narayana N. Panicker, Dallas, both of Tex.

[73] Assignee: Mobil Oil Corporation, New York, N.Y.

[21] Appl. No.: 724,745

[22] Filed: Apr. 18, 1985

[51] Int. Cl.[4] ............................................. E21B 41/04
[52] U.S. Cl. ................................... 405/169; 166/345; 405/170
[58] Field of Search ...................... 405/169, 170, 171; 166/341, 342, 343, 345

[56] References Cited

U.S. PATENT DOCUMENTS

| | | | |
|---|---|---|---|
| 2,962,096 | 11/1960 | Knox | 166/341 X |
| 3,500,906 | 3/1970 | Petersen | 166/341 |
| 3,710,859 | 1/1973 | Hanes et al. | 166/341 X |
| 4,182,584 | 1/1980 | Panicker et al. | |
| 4,478,287 | 10/1984 | Hanes | 166/341 |

OTHER PUBLICATIONS

OTC 4512, Deepwater Production Riser, Panicker and Yancey, presented at the 15th Annual Offshore Technology Conference, Houston, TX, May 2-5, 1983.

Primary Examiner—Dennis L. Taylor
Attorney, Agent, or Firm—Alexander J. McKillop; Michael G. Gilman; Charles J. Speciale

[57] ABSTRACT

A subsea connector system for connecting the lower end of a structural core of a marine riser to a base which has been preset on the marine bottom. The box member of the connector system forms an integral part of a tapered section which, in turn, forms the lower end of the riser. The connector system, in a preferred embodiment, incudes a self-contained source of hydraulic fluid under pressure which actuates the connector to a locked position upon command. The connector also includes a back-up means for remotely locking the connector and three separate means for remotely unlocking the connector.

15 Claims, 5 Drawing Figures

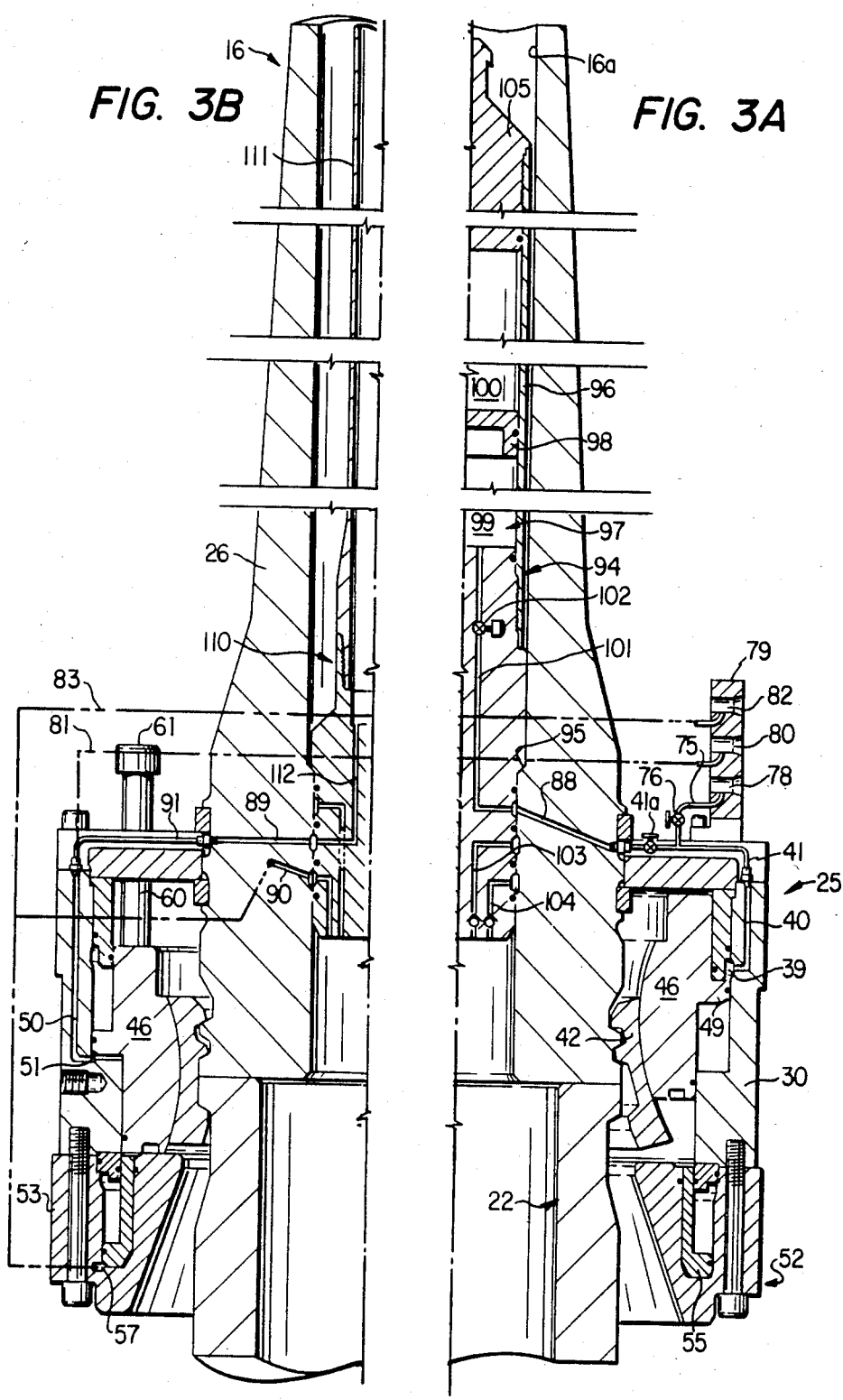

MARINE RISER STRUCTURAL CORE CONNECTOR

TECHNICAL FIELD

The present invention relates to a marine riser connector and more particularly relates to a subsea connector system for releasably connecting the structural core of a marine riser to a base preset on the marine bottom.

BACKGROUND ART

A critical consideration in the production of fluid hydrocarbons from marine deposits lies in providing a fluid communication system from the marine bottom to the surface after production has been established. Such a system, commonly called a production riser, usually includes multiple conduits through which various produced fluids are transported to and from the surface, including oil and gas production lines, service, electrical and hydraulic control lines.

For offshore production, a floating facility can be used as a production and/or storage platform. Since the facility is constantly exposed to surface and sub-surface conditions, it undergoes a variety of movements. In such a zone of turbulence, heave, roll, pitch, drift, etc., may be caused by surface and near surface conditions. In order for a production riser system to function adequately with such a facility, it must be sufficiently compliant to compensate for such movements over long periods of operation without failure.

Examples of such compliant marine riser systems are disclosed and discussed in U.S. Pat. Nos. 4,182,584; 4,367,055; 4,400,109; and 4,423,984; in paper OTC 4512, "Deepwater Production Riser", Panicker and Yancey, presented at the 15th annual Offshore Technology Conference, Houston, Tex., May 2-5, 1983; and in co-pending U.S. patent application Ser. No. 722,026, filed concurrently herewith. As seen from these references, a typical compliant riser system includes (1) a vertically rigid section which extends from the marine bottom to a fixed position below the zone of turbulence that exists near the surface of the water, and (2) a flexible section which is comprised of flexible flowlines that extend from the top of the rigid section, through the turbulent zone, to a floating vessel on the surface. A submerged buoy is attached to the top of the rigid section to maintain the rigid section in a substantially vertical position within the water.

Due to the substantial water depths in those production areas where compliant or equivalent marine risers are designed for use, the use of divers on or near the marine bottom is viturally prohibited. Accordingly, the lower end of the marine riser must be capable of being remotely connected to the marine bottom without requiring any substantial assistance from divers. To accomplish this in most previously known systems of this type, a hydraulic connector is attached to the lower end of the riser and long flowlines are extended from the surface to supply the hydraulic fluid required to actuate the connector. The deployment and handling of these long flowlines can present substantial problems especially in rough waters.

Further, the hydraulic connector is normally a separate unit which is bolted or otherwise secured to the lower end of the riser. As such, the point at which the connector is joined to the riser is subjected to substantial forces when the riser experiences forces which tend to move the riser to and from vertical about a pivot point inherently existing at the lower end of the riser where it is secured to the marine bottom. Continued application and relaxation of these forces can lead to failure at the "weakened" point where the separate connector is joined to the riser.

Further, since risers of this type may have to be removed and/or replaced during or at the end of their operational lives, the connector used for connecting a riser to the marine bottom should also be capable of being remotely released.

DISCLOSURE OF THE INVENTION

The present invention provides a subsea connector system for connecting the lower end of a structural core of a marine riser to a base which has been preset on the marine bottom. The box member of the connector system forms an integral part of a tapered section which, in turn, forms the lower end of the riser. The connector system, in a preferred embodiment, includes a self-contained source of hydraulic fluid under pressure which actuates the connector to a locked position upon command. The connector also includes a back-up means for remotely locking the connector and three separate means for remotely unlocking the connector.

More specifically, the connector system of the present invention includes a box member and a pin member, the latter being attached to a base preset on the marine bottom. The box member is formed of a housing which is mounted onto the wall of a tapered section which, in turn, forms the lower end of the structural core of the riser. As known in this art, a tapered section or "taper joint" is normally used as the lower part of a riser core or the like to strengthen the core by better distributing the bending forces normally exerted thereon once the core is attached to a marine bottom.

A lockdown means is positioned in the housing and has dogs thereon adapted to cooperate with said core and said pin member to lock the two together when the connector is in a locked position. An actuator having a piston thereon is slidably positioned in the housing and is adapted to cooperate with said lockdown means to move the lockdown means to a locked position. A first passage means in the housing leads to the upper side of the piston on the actuator means and is connected to a self-contained, pressurized fluid source which is carried by the box member. An acoustically-actuated valve is positioned in the outlet of the fluid source whereby the valve will be opened upon the receipt of an acoustical signal to allow the fluid to move the piston and, hence, the actuator means downward to lock the taper joint to the pin member.

A lock port in a stab plate which is mounted external of the housing is connected to said first passage means to provide a back-up locking means if the self-contained fluid fails to fully lock the connector. A pressure balanced sub from a submerged, remotely operated vehicle (ROV) is stabbed into the lock port and fluid under pressure is supplied therethrough. The stab plate also has a primary and a secondary unlock port therein. The primary port is connected to a second passage means in the housing which leads to the underside of the piston on the actuator means while the secondary unlock port is connected a third passage means which leads to the underside of a second piston which is in engagement with said lockdown means. A mechanical means is also provided to unlock the connector if the primary and secondary unlock means fail.

In another embodiment, the connector of the present invention is locked by an internal tool which carries a supply of hydraulic fluid under pressure. The tool is prepositioned within or is dropped down the bore of the riser core and is landed adjacent the box member where the outlet of the tool will be aligned with a passage in the core which, in turn, is in fluid communication with the first passage means in the housing. An acoustically-operated valve in the tool outlet is then opened by a signal transmitted down the bore and the fluid from the tool locks the connector.

BRIEF DESCRIPTION OF THE DRAWINGS

The actual construction, operation, and apparent advantages of the present invention will be better understood by referring to the drawings in which like numerals identify like parts and in which:

FIG. 3A is a sectional view of another embodiment of the connector of the present invention having a first internal setting tool within the bore of the riser core; and FIG. 3B is a sectional view of the connector of FIG. 2B having another setting tool within the bore of the riser core.

BEST MODE FOR CARRYING OUT THE INVENTION

Figure 1:
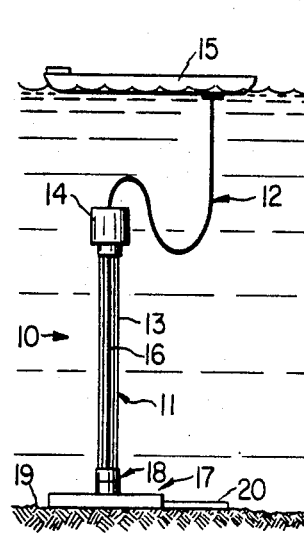
FIG. 1 is a perspective view of a typical environment, e.g. a marine compliant riser system, in which the present invention may be used.

To better understand the present invention, a brief description of a typical environment in which the flowline connector of the present invention is likely to find widespread use will first be set forth. Referring more particularly to the drawings, FIG. 1 discloses a typical compliant marine riser system 10 in an operable position at an offshore location. Riser system 10 is comprised of a lower rigid section 11 and an upper flexible section 12. Flexible section 12 is comprised of one or more flexible conduits which connect to respective flowlines 13 on rigid section 11 and which extend from buoy 14 to the surface of the water where they are connected to floating facility 15.

Structural core (i.e. rigid conduit 16) of rigid section 11 is affixed by core connector 18 to base 17 which, in turn, is preset on marine bottom 19. Fluids produced from a subsea well or wells is flowed to base 17 through submerged flowline 20 for production to the surface through riser 10. The details of a typical base 17 and method for installing a marine riser thereon are disclosed in commonly assigned, co-pending U.S. patent application Ser. No. 722,026, filed concurrently herewith and incorporated herein by reference. While the present invention has been illustrated as being useful in connection with a marine compliant riser system, it will be understood that the riser core connector 18 of the present invention can be used equally as well in connecting other known types of riser systems to a marine bottom.

Figure 2B:
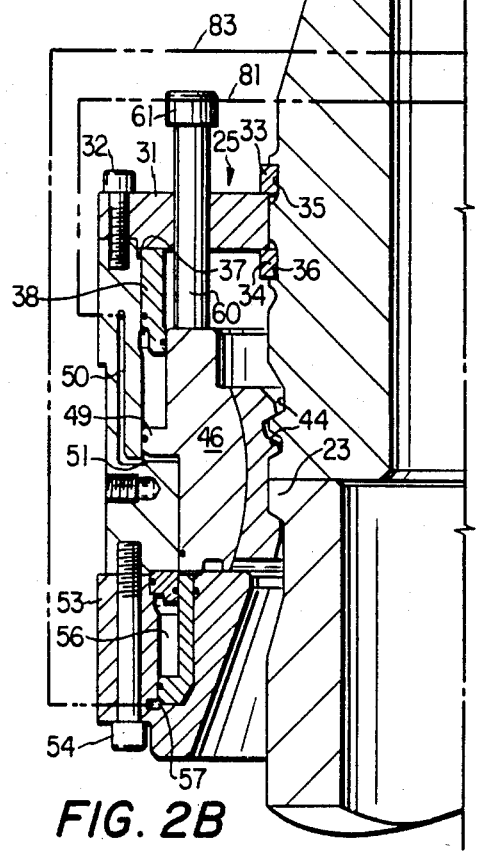
FIG. 2B is a sectional view of the connector of FIG. 2A with the connector in a locked position.
Figure 2A:
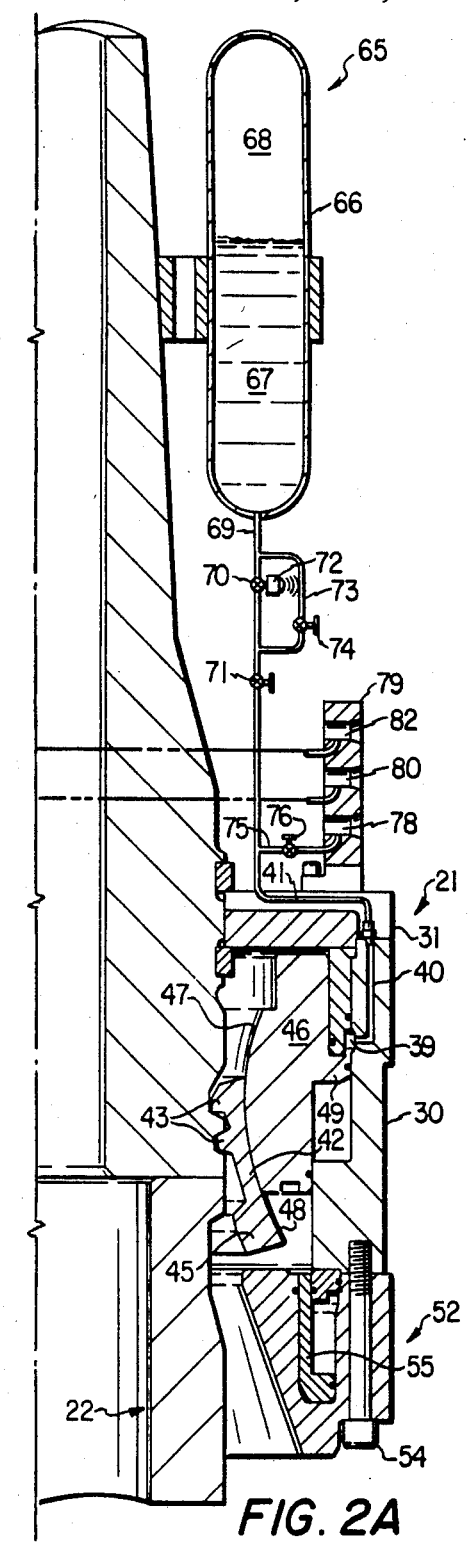
FIG. 2A is a sectional view of one embodiment of the riser core connector of the present invention with the connector in an unlocked position.

Referring now to FIGS. 2A and 2B, riser structural core connector 18 of the present invention is comprised of a box member 21 and a pin member 22. FIG. 2A discloses connector 18 in an open or unlocked position while FIG. 2B discloses connector 18 in a closed or locked position. As will be understood, pin member 22 is preferably a landing mandrel affixed to and extending upward from base 17 which, in turn, is preset on marine bottom 19. Pin member 22 provides the main structural element on base 17 for attaching box member 21 thereto and has an annular flange 23 at the upper end thereof for a purpose described later.

Box member 21 comprises a connector assembly 25 affixed to the lower end of structural core 16 of riser section 11. Core 16 is a rigid conduit which is adapted to extend throughout the rigid section of a marine riser. Preferably, as illustrated, core 16 terminates at its lower end in a tapered section or taper joint 26 which substantially strengthens core 16 at a critical point where the core is subjected to substantial bending forces when installed. Further, preferably, as illustrated, the lower end of tapered section 26 forms an integral part of connector 25 as will be described below.

Connector assembly 25 is comprised of housing 30 which is secured to an annular top plate 31 by a plurality of bolts 32 (only one shown in FIG. 2B). Plate 31 encircles and is secured to the wall of tapered section 26 of core 16 by upper and lower split retaining rings 33, 34 which cooperate with grooves 35, 36, respectively, in tapered section 26. Positioned between plate 31 and shoulder 37 on housing 30 is an annular pressure seal ring 38 which has a reduced portion on its lower external surface which forms chamber 39 which, in turn, is in fluid communication with first passage means (i.e. passages 40, 41) in housing 30 and plate 31, respectively, for a purpose described below.

Mounted in housing 30 is a split, lockdown ring 42 of spring steel or the like which is in an open position as shown in FIG. 2A. Ring 42 has one or more dogs 43 which engage grooves 44 in tapered section 26 and dog 45 which is adapted to cooperate with flange 23 on pin member 22 when connector assembly 25 is in a locked position (FIG. 2B). Slidably mounted in housing 30 is actuator ring 46 which has an inner surface 47 which conforms to the outer surface 48 lockdown ring so that when actuator ring 46 is moved downward it will cooperate with the lockdown ring to move same to a locked position (FIG. 2B). For details of a connector including a lockdown ring and an actuator having such a configuration, see co-pending application Ser. No. 06/343,496 now U.S. Pat. No. 4,516,795. Actuator ring 46 has an annular flange 49 which acts as a first piston to force actuator 46 downward upon application of fluid under pressure to chamber 39 as will be more fully described below.

Housing 30 has a second passage means (i.e. passage 50) therein which is in fluid communication with chamber 51 in housing whereby fluid can be supplied to the underside of first piston 49 to unlock connector 18 as will be discussed below. A backup means for unlocking connector 18 is secondary unlock assembly 52 which, as shown, is comprised of a subhousing 53 which is secured to the lower end of housing 30 by a plurality of bolts 54 or the like. It should be understood that housing 30 and subhousing 53 could be integral if desired. A second piston 55 is slidably mounted within chamber 56 of subhousing 53 and is position so that its upper end will engage the lower surface of actuator ring 46. Subhousing 53 has a third passage means (i.e. port 57) therein which is in fluid communication with chamber 56 at a point below piston 55. A tertiary backup means for unlocking connector 18 is comprised of one or more rods 60 which are connected to the upper surface of actuator ring 46 and extend upward through top plate 31. Rod 60 has a head 61 thereon adapted to be engaged by an external mechanical means, e.g. pull lines or jacks attached or positioned by a remotely operated vehicle (ROV) or submarine, to be pulled or jacked upward to release lockdown ring 42 and thereby unlock connector 18.

In the embodiment of the present invention disclosed in FIGS. 2A, 2B, connector 18 is set or locked by a self-contained source 65 of hydraulic fluid. Source 65 comprises a pressure tank 66 partly filled with the required volume of hydraulic fluid 67 and charged with gas 68, e.g. nitrogen, under sufficient pressure to force fluid from tank 66 to set connector assembly 25 upon command. The outlet of tank 66 is connected to passages 41, 40 by line 69 which includes a closed valve 70 and an open valve 71. Valve 70 has an acoustical actuator 72 (e.g. such as those used with the BOP Control System of N L Shaffer, Houston, Tex., see pps. 5526–27, COMPOSITE CATALOG OF OIL FIELD EQUIPMENT AND SERVICES, 1984–85, Gulf Publishing Co.) thereon which opens valve 70 upon receiving a defined acoustical signal. A by-pass line 73 having closed valve 74 therein connects to spaced points along line 69 to by-pass valve 70 for a purpose discussed below.

Also connected into line 69 is back-up line 75 having normally closed valve 76 therein. Line 75 is in fluid communication with lock port 78 of stab plate 79, which, in turn, is mounted on box member 21. Stab plate 79 also includes primary unlock port 80 which is fluidly connected to passage 50 by line 81 and secondary unlock port 82 which is connected to port 57 by line 83.

In operation, box member 21 on structural core 16 of a marine riser is lowered onto pin member with connector assembly 25 being in the position shown in FIG. 2A. When box member 21 is in position on pin member 22, an acoustical signal is generated from a ROV or from the surface to actuate acoustical actuator 72 to open valve 70 in line 69. The pressure of gas 68 in tank 66 forces fluid 67 under pressure through line 69, passages 41, 40, and into chamber 39 to thereby force piston 49 on actuator ring 46 downward. As actuator ring moves downward, it cooperates with lockdown ring 42 to move same to the position shown in FIG. 2B, thereby locking box member 21 to pin member 22.

By remotely operated TV cameras or the like, the connection between box member 21 and pin member is checked and if it is determined that connector assembly 25 failed to operate to fully secure the connection, a series of backup steps are performed with the aid of an ROV or submarine. First, valve 74 in by-pass line 73 is opened. If acoustical actuator 72 has failed to open valve 70, fluid 67 can now flow through by-pass line 73 to carry out the desired operation. If valve 70 has been opened and/or the opening of valve 74 does not correct the problem, a pressure balanced sub (not shown) from a ROV or submarine is stabbed into lock port 78 on stab plate 79, valve 76 is opened, and fluid under high pressure (e.g. 3000 psi) is applied therefrom to chamber 39 to complete the locking operation. Valves 76 and 71 are then closed and the sub is removed from port 78.

If and when it becomes unnecessary to unlock connector 18 so that box member 21 can be removed from pin member, a balance pressure sub (not shown) from a ROV or submarine is stabbed into primary unlock port 80 in stab plate 79. Fluid under pressure is then applied through line 81 and passage 50 to chamber 51 to move piston 49, and hence, actuator ring 46 upward to release lockdown ring 42 to thereby unlock connector assembly 25. If it becomes obvious that actuator ring 46 is stuck or will not move, then a pressure balanced sub is stabbed into secondary unlock port 82 and fluid under pressure is applied to port 57 through line 83 to force second piston 55 upward. As piston 55 move upward, it pushes against the lower surface of actuator ring 46 to force same upward to release lockdown ring 42. If this step also fails to release the connector, pull lines or hydraulic jacks can be installed on rod 60 by a ROV or submarine to move rod 60 upward to pull actuator ring 46 upward to thereby release lockdown ring 46.

Referring now to FIGS. 3A–3B, another embodiment of the present invention is disclosed. The basic structure of box member 21 and pin member 22 is identical to that described above except for the inclusion of additional passages in tapered joint 26 as will now be described. Passages 88, 89, and 90 are provided in tapered section 26 which fluidly communicate with passages 41, 91, and line 83 respectively. Passage 41, having a normally open valve 41a therein, communicates through passage 40 with chamber 39 in housing 30; passage 91 communicates through passage 50 to chamber 51 in housing 30; and line 83 communicates with port 57 in subhousing 58.

As shown in FIG. 3A, connector assembly 25 is set or locked by pumping or lowering an internal setting tool 94 through the bore 16a of core 16 until it engages shoulder 95 in tapered section 26. Tool 94 is comprised of a housing 96 having a chamber 97 therein. A piston 98 is slidably mounted in chamber 97 and separates hydraulic fluid 99 from gas 100 which is charged under pressure. Outlet passage 101 having a normally closed, acoustically-operated valve 102 therein is provided in tool 94 which cooperates with passage 88 in tapered section 26. Passages 103, 104 are provided in tool 94 to communicate with passage 91 and line 83, respectively, to vent the respective chambers below pistons 49, 55 during the setting operations.

It can be seen that upon receipt of an acoustical signal down bore 16a, valve 102 opens and gas 100 forces piston 98 downward to force fluid 99 out of tool 94 and into chamber 39 to lock box member 21 to pin member 22, as described above. Valve 41a is then closed and a wireline overshot tool is then lowered to engage fishing neck 105 on tool 94 to remove same. If for some reason, connector assembly 25 is not completely locked by the fluid 99 from tool 94, the backup procedure utilizing stab plate 78 as described above is used to complete the locking operation.

To unlock the embodiment shown in FIG. 2A, an internal locking tool (not shown) having identical construction to tool 94 is used except the outlet passage (i.e. 101 in tool 94) is adapted to communicate with passage 91 and/or line 83 while the vent passages in the tool communicate with the other appropriate passages in box member 25. Again, if connector assembly 25 fails to unlock, the primary and/or secondary ports 80, 82 in stab plate 78 can be used to complete the operation.

As seen in FIG. 3B, the connector assembly 25 is set or locked by an internal tool 110 which is adapted to be lowered through bore 16a on the lower end of tubing string 111. In the unlocking version of tool 110 (shown in FIG. 3B), outlet passage 112 communicates with passage 91 so fluid from tubing will flow to chamber 51 to unlock connector assembly 25. The locking version of tool 110 (not shown) has an outlet passage 112 which will communicate with passage 88 to allow fluid flowed down tubing 111 to flow to chamber 39 to lock connector assembly as described above. Stab ports in plate 78 are still available if either the lock or unlock operation fails to be completed by tool 110.

What is claimed is:

1. A subsea connector comprising:
   a pin member adapted to be positioned at a submerged location; and
   a box member adapted to be received by said pin member and be releasably locked thereto, said box member comprising:
   a connector assembly comprising:
   a housing;
   a lockdown means in said housing, said lockdown means normally in an unlocked position;
   an actuator means slidably positioned in said housing and adapted to cooperate with said lockdown means when said actuator is moved downward in said housing:
   a first passage means in said housing for fluid communication with a first chamber in said housing above and in fluid communication with said actuator means;
   a stab plate mounted on said box member external of said housing and having a lock port therein in fluid communication with said first passage means and adapted to receive fluid from an external source, whereby fluid received through said lock port will flow to said chamber to force said actuator means downward to move said lockdown means to a locked position;
   a second passage means in said housing for fluid communication with a second chamber in said housing below and in fluid communication with said actuator means;
   a primary unlock port in said stab plate in fluid communication with said second passage means and adapted to receive fluid from an external source whereby fluid received through said primary unlock port will flow to said second chamber to force said actuator means upward to allow said lockdown means to move to an unlocked position;
   a piston slidably mounted in housing below and in contact with said actuator means;
   a third passage means in said housing for fluid communication with a third chamber in said housing below and in fluid communication with said actuator; and
   a secondary unlock port in said stab plate in fluid communication with said third passage means and adapted to receive fluid from an external source whereby fluid received through said secondary unlock port will flow to said third chamber to force said piston upward to move said actuator means upward to allow said lockdown means to move to an unlocked position.

2. The subsea connector of claim 1 including:
   at least one rod attached at one end to said actuator means and having its other end extending out of said housing; said other end of said rod being adapted to be manipulated to mechanically move said actuator means.

3. The subsea connector of claim 1 including:
   a self contained source of fluid comprising:
   a tank having an outlet mounted on said box member;
   fluid partially filling said tank;
   gas under pressure filling the remainder of said tank;
   means for fluidly connecting said outlet of said tank to said first passage means in said housing, said fluidly connecting means including:
   a normally closed remotely-operated valve means.

4. The subsea connector of claim 3 wherein said remotely-operated valve means includes:
   an acoustically-operated actuator means for moving said valve means to an open position upon receipt of an acoustic signal.

5. The subsea connector of claim 2 including:
   a self contained source of fluid comprising:
   a tank having an outlet mounted on said box member;
   fluid partially filling said tank;
   gas under pressure filling the remainder of said tank;
   means for fluidly connecting said outlet of said tank to said first passage means in said housing, said fluidly connecting means including:
   a normally closed, remotely operated valve means.

6. The subsea connector of claim 5 wherein said remotely operated valve means includes:
   an acoustically-operated actuator means for moving said valve means to an open position upon receipt of an acoustic signal.

7. A subsea connector for connecting a marine riser to a base preset on a marine bottom, said connector comprising:
   a pin member adapted to be affixed to said base and extending upward therefrom; and
   a box member adapted to form an integral part of the lower end of said riser core; said box member comprising:
   a housing having an annular top plate, said top plate encircling the wall of the lower end of said core;
   means to secure said top plate to said wall of said core;
   a lockdown means in said housing, said lockdown means normally in an unlocked position;
   actuator means slidably positioned in said housing and adapted to cooperate with said lockdown means when said actuator is moved downward in said housing;
   a first passage means in said housing for fluid communication with a first chamber in said housing above and in fluid communication with said actuator means;
   means for supplying fluid to said first passage means wherein said riser core has a longitudinal bore therethrough and wherein said means for supplying fluid includes:
   a passage in said riser core extending from said bore of said core to said first passage means in said housing.

8. The subsea connector of claim 7 wherein said means for supplying fluid further includes:
   an internal tool adapted to be lowered through said bore of said riser core to a point adjacent said connector, said tool comprising:
   a tool housing having an outlet adapted to be in fluid communication with said passage in said riser core when said tool is adjacent said connector;
   fluid partially filling said tool housing;
   gas under pressure filling the remainder of said tool housing; and
   a normally closed remotely-operated valve means in said outlet of said tool.

9. The subsea connector of claim 8 wherein said remotely-operated valve means includes:

an acoustically-operated actuator means for moving said valve means to an open position upon receipt of an acoustical signal.

10. The subsea connector of claim 7 wherein said means for supplying fluid further includes:
an internal tool adapted to be connected to the lower end of a tubing string and lowered through said bore of said riser core to a point adjacent said connector;
an outlet passage in said tool adapted to be in fluid communication with said passage in said riser core when said tool is adjacent said connector so that fluid flowing down said tubing will flow through said tool outlet to lock said connector.

11. The subsea connector of claim 10 including:
a piston slidably mounted in housing below and in contact with said actuator means;
a third passage means in said housing for fluid communication with a third chamber in said housing below and in fluid communication with said actuator; and
a secondary unlock port in said stab plate in fluid communication with said third passage means and adapted to receive fluid from an external source whereby fluid received through said secondary unlock port will flow to said third chamber to force said piston upward to move said actuator means upward to allow said lockdown means to move to an unlocked position.

12. The subsea connector of claim 11 including:
at least one rod attached at one end to said actuator means and having its other end extending out of said housing; said other end of said rod being adapted to be manipulated to mechanically move said actuator means.

13. The subsea connector of claim 11 including:
a self contained source of fluid comprising:
a tank having an outlet mounted on said box member;
fluid partially filling said tank;
gas under pressure filling the remainder of said tank;
means for fluidly connecting said outlet of said tank to said first passage means in said housing, said fluidly means including:
a normally closed, remotely-operated valve means.

14. The subsea connector of claim 13 wherein said remotely-operated valve means includes:
an acoustically-operated actuator means for moving said valve means to an open position upon receipt of an acoustic signal.

15. A subsea connector for connecting a marine riser core to a base preset on a marine bottom, said connector comprising:
a pin member adapted to be affixed to said base and extending upward therefrom; and
a box member adapted to form an integral part of the lower end of said riser core; said box member comprising:
a housing having an annular top plate, said top plate encircling the wall of the lower end of said core;
means to secure said top plate to said wall of said core;
a lockdown means in said housing, said lockdown means normally in an unlocked position;
actuator means slidably positioned in said housing and adapted to cooperate with said lockdown means when said actuator is moved downward in said housing;
a first passage means in said housing for fluid communication with a first chamber in said housing and in fluid communication with said actuator means;
means for supplying fluid to said first passage means;
a stab plate mounted on said box member external of said housing and having a lock port therein in fluid communication with said first passage means and adapted to receive fluid from an external source whereby fluid received through said lock port will flow to said chamber to force said actuator means downward to move said lockdown means to a locked position;
a second passage means in said housing for fluid communication with a second chamber in said housing below and in fluid communication with said actuator means; and
a primary unlock port in said stab plate in fluid communication with said second passage means and adapted to receive fluid from an external source whereby fluid received through said primary unlock port will flow to said second chamber to force said actuator means upward to allow said lockdown means to move to an unlocked position.

* * * * *